United States Patent
Satou et al.

(10) Patent No.: US 11,158,186 B2
(45) Date of Patent: Oct. 26, 2021

(54) SYSTEM FOR CONTROLLING A PLURALITY OF DEVICES USING A CNC DEVICE

(71) Applicant: FANUC CORPORATION, Yamanashi (JP)

(72) Inventors: Yoshiki Satou, Yamanashi-ken (JP); Toru Kobayashi, Yamanashi-ken (JP)

(73) Assignee: Fanuc Corporation

( * ) Notice: Subject to any disclaimer, the term of this patent is extended or adjusted under 35 U.S.C. 154(b) by 0 days.

(21) Appl. No.: 16/742,056

(22) Filed: Jan. 14, 2020

(65) Prior Publication Data
US 2020/0234565 A1   Jul. 23, 2020

(30) Foreign Application Priority Data
Jan. 22, 2019   (JP) .............................. JP2019-008536

(51) Int. Cl.
G08C 17/02   (2006.01)
H04W 76/10   (2018.01)

(52) U.S. Cl.
CPC ............ *G08C 17/02* (2013.01); *H04W 76/10* (2018.02); *G08C 2201/51* (2013.01)

(58) Field of Classification Search
None
See application file for complete search history.

(56) References Cited

U.S. PATENT DOCUMENTS 4,124,889 A  *  11/1978  Kaufman .................. G06F 11/10
                                                                    700/3
5,317,501 A  *   5/1994  Hilpert ................. G05B 19/4145
                                                                    700/3
(Continued)

FOREIGN PATENT DOCUMENTS

JP   2008217662 A   9/2008
JP   2009177298 A   8/2009
JP   2018148337 A   9/2018

OTHER PUBLICATIONS

English Abstract for Japanese Publication No. 2018148337 A, published Sep. 20, 2018, 1 pg.
English Abstract and Machine Translation for Japanese Publication No. 2008-217662 A, published Sep. 18, 2008, 5 pgs.
English Abstract and Machine Translation for Japanese Publication No. JP2009-177298A, published Aug. 6, 2009, 9 pgs.

* cited by examiner

*Primary Examiner* — Muhammad Adnan
(74) *Attorney, Agent, or Firm* — Fredrikson & Byron, P.A.

(57) ABSTRACT

A system includes a communication circuit provided in at least one of multiple devices that are connected to a control device in a predetermined connection relationship. The control device includes: a signal transmitter designating, as a destination, one of the devices provided with the communication circuit, based on the connection relationship, and transmitting a call signal to the device designated as the destination; a receiver circuit wirelessly receiving a recall signal, which is transmitted in response to the call signal; and a determination unit determining that the control device and the device designated as the destination are connected in the connection relationship when the receiver circuit receives the recall signal. The communication circuit wirelessly transmits the recall signal to the control device when the device provided with the communication circuit itself is designated as the destination and when the device provided with the communication circuit itself receives the call signal.

6 Claims, 3 Drawing Sheets

(56) References Cited

U.S. PATENT DOCUMENTS

| | | | |
|---|---|---|---|
| 5,831,848 A * | 11/1998 | Rielly | G05B 19/4185 700/3 |
| 5,886,894 A * | 3/1999 | Rakoff | G05B 19/0421 700/3 |
| 5,900,824 A * | 5/1999 | Hayashi | H04Q 9/00 340/870.11 |
| 5,990,638 A * | 11/1999 | Aoyama | G05B 19/4141 318/562 |
| 6,286,071 B1 * | 9/2001 | Iijima | H04L 12/40084 710/124 |
| 6,359,970 B1 * | 3/2002 | Burgess | H04L 47/10 379/142.01 |
| 6,587,474 B1 * | 7/2003 | Griessbach | B60R 16/0315 370/446 |
| 6,823,219 B2 * | 11/2004 | Lee | G05B 15/02 340/855.4 |
| 7,026,784 B2 * | 4/2006 | Shimizu | G05B 23/0235 318/400.13 |
| 7,119,505 B2 * | 10/2006 | Komaki | G05B 19/408 318/113 |
| 8,458,372 B2 * | 6/2013 | Hsieh | G06F 13/42 710/9 |
| 8,502,647 B2 * | 8/2013 | Seitz | G05B 19/406 340/10.5 |
| 8,994,509 B2 * | 3/2015 | Gottlich | A61C 1/0023 340/10.34 |
| 9,054,608 B2 * | 6/2015 | Sugie | G05B 19/4155 |
| 9,308,647 B2 * | 4/2016 | Linnell | B25J 9/1661 |
| 9,459,607 B2 * | 10/2016 | Frazer | G05B 15/02 |
| 10,001,999 B2 * | 6/2018 | Tran | G06F 30/34 |
| 10,374,736 B2 * | 8/2019 | Hoshino | G06F 13/4247 |
| 10,599,134 B2 * | 3/2020 | Benson | G05B 19/0423 |
| 10,734,926 B2 * | 8/2020 | Oka | B30B 1/186 |
| 2004/0160206 A1 * | 8/2004 | Komaki | G05B 19/408 318/569 |
| 2006/0116667 A1 * | 6/2006 | Hamel | H04W 12/08 606/1 |
| 2008/0238351 A1 * | 10/2008 | Aoyama | G05B 19/4148 318/569 |
| 2014/0005835 A1 * | 1/2014 | Nishiyama | G05B 19/4145 700/275 |
| 2014/0046497 A1 * | 2/2014 | Ueno | H02J 4/00 700/295 |
| 2014/0148147 A1 * | 5/2014 | Tak | H04M 1/72415 455/420 |
| 2014/0200684 A1 * | 7/2014 | Mizutani | G05B 19/4185 700/23 |
| 2016/0011580 A1 * | 1/2016 | Tanaka | G05B 19/4141 700/159 |
| 2017/0007336 A1 * | 1/2017 | Tsuboi | A61B 34/30 |
| 2017/0246741 A1 * | 8/2017 | Kobayashi | B25J 9/126 |
| 2018/0107170 A1 * | 4/2018 | Iwahashi | G05B 9/03 |
| 2018/0254854 A1 * | 9/2018 | Komaki | H04L 1/0042 |
| 2019/0079501 A1 * | 3/2019 | Koga | H04Q 9/02 |
| 2019/0225457 A1 * | 7/2019 | Koivisto | H04W 4/33 |

SYSTEM FOR CONTROLLING A PLURALITY OF DEVICES USING A CNC DEVICE

CROSS-REFERENCE TO RELATED APPLICATION

This application is based upon and claims the benefit of priority from Japanese Patent Application No. 2019-008536 filed on Jan. 22, 2019, the contents of which are incorporated herein by reference.

BACKGROUND OF THE INVENTION

Field of the Invention

The present invention relates to a system. In particular, the present invention relates to a system including a control device and a plurality of devices connected to the control device in a predetermined connection relationship.

Description of the Related Art

Japanese Laid-Open Patent Publication No. 2018-148337 discloses a communication system having a configuration in which a plurality of servo amplifiers are connected to a numerical control device (also called CNC). Each servo amplifier has a servo motor connected thereto.

SUMMARY OF THE INVENTION

In operating the communication system disclosed in Japanese Laid-Open Patent Publication No. 2018-148337, the operator sends a command signal for rotating a specific servo motor from the CNC to a specific servo amplifier to which the servo motor is connected. Here, if the CNC and the multiple servo amplifiers are not connected in a predetermined connection relationship, the operator cannot cause the intended servo amplifier to receive the command signal.

It is therefore an object of the present invention to provide a system that enables easy detection that a control device and a device are connected in a predetermined connection relationship.

An aspect of the invention resides in a system including a control device and a plurality of devices connected to the control device in a predetermined connection relationship, the system including a communication circuit that is provided in at least one of the multiple devices and configured to perform wireless communication. The control device includes: a signal transmitter configured to designate, as a destination, one of the devices that is provided with the communication circuit, based on the connection relationship, and transmit a call signal to the device designated as the destination; a receiver circuit configured to wirelessly receive a recall signal, which is transmitted in response to the call signal; and a determination unit configured to determine that the control device and the device designated as the destination are connected in the connection relationship when the receiver circuit receives the recall signal. The communication circuit is configured to wirelessly transmit the recall signal to the control device when the device provided with the communication circuit itself has been designated as the destination and when the device provided with the communication circuit itself receives the call signal.

According to the present invention, it is possible to easily detect that the control device and the devices are connected in a predetermined connection relationship.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be detailed below by describing a preferred embodiment with reference to the accompanying drawings.

Embodiment

Figure 1:
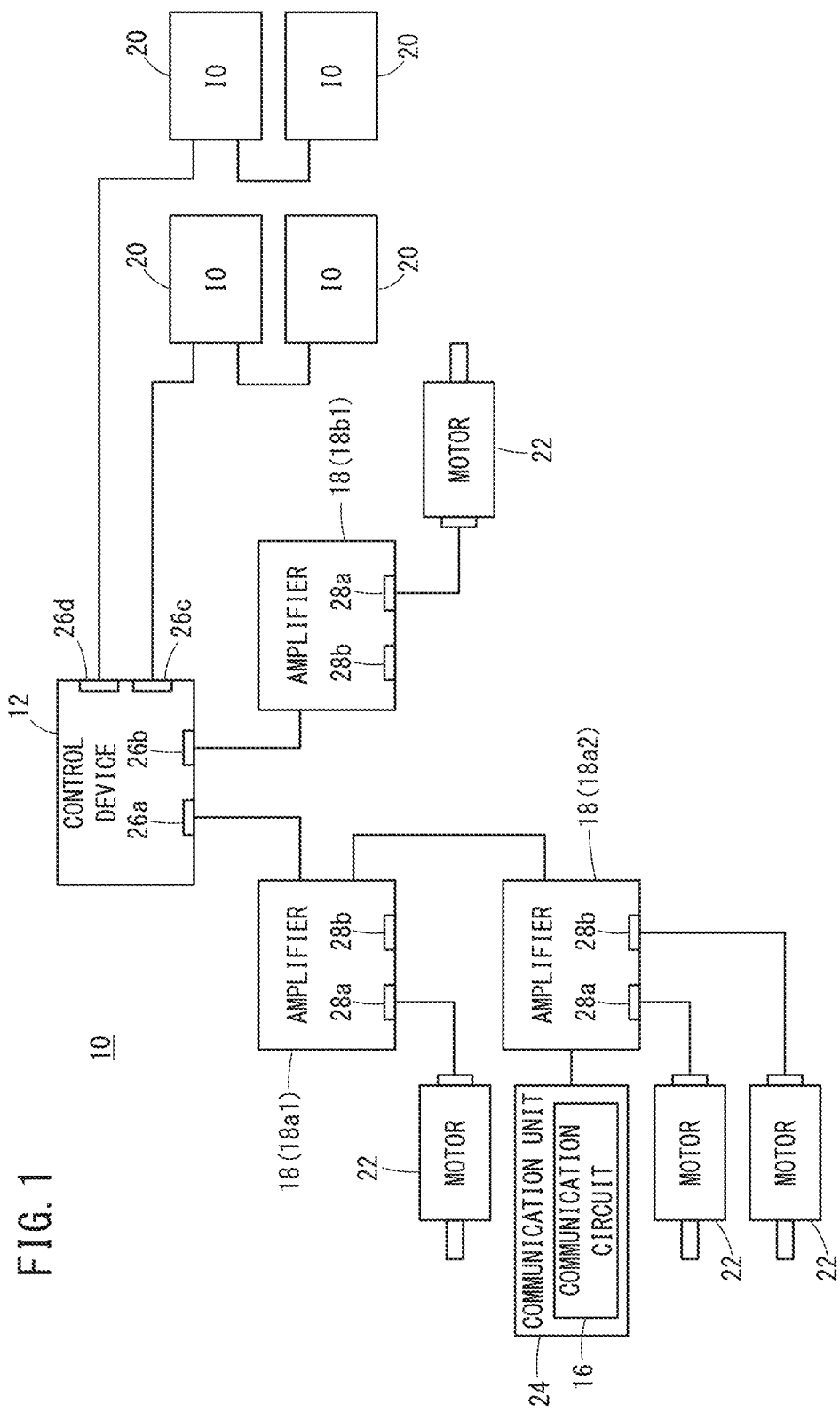
FIG. 1 is a block diagram simply showing a configuration of a system according to an embodiment.

FIG. 1 is a block diagram simply showing a configuration of a system 10 according to the embodiment.

The system 10 includes a control device 12, a plurality of devices 14 connected to the control device 12, and a communication circuit 16 provided on at least one of the devices 14 and configured to perform wireless communication. The multiple devices 14 include, for example, amplifiers 18 (servo amplifiers 18), IOs 20 (input-output devices) to which unillustrated sensors etc. are connected, and motors 22 (servo motors 22) connected to the amplifiers 18. That is, each of the amplifiers 18, IOs 20 and motors 22 shown in FIG. 1 is regarded as a device 14. In the following description, if it is not necessary to mention a device by distinguishing between amplifiers 18, IOs 20 and motors 22, it is generally referred to as "device 14". In the following description, in order to distinguish and explain each of the multiple amplifiers 18, each of the multiple amplifiers 18 may be referred to as an amplifier 18a1, an amplifier 18a2, and an amplifier 18b1 for convenience.

In this embodiment, the communication circuit 16 is installed in a communication unit 24, which can be detachably attached to each of the multiple devices 14. Thus, the operator can attach the communication unit 24 to a desired device 14, whereby the communication circuit 16 can be installed in the device 14. Note that the communication circuit 16 may be incorporated in each of the multiple devices 14 as, for example, an electronic component (chip) whose function can be turned on and off, as appropriate.

The control device 12 and the multiple devices 14 are connected based on a predetermined connection relationship (connection map). The work to connect the control device 12 to the multiple devices 14 is performed by an operator. The connection map in the present embodiment is as shown in FIG. 1. That is, multiple amplifiers 18 having motors 22 connected thereto, or multiple IOs 20 are connected to the control device 12 in a daisy chain fashion such that the amplifiers or the IOs are sequentially connected from one of multiple terminals 26 (26a, 26b, 26c, 26d) of the control device 12. Each of the multiple motors 22 is connected to one of multiple motor terminals 28 (28a, 28b) included in the amplifier 18. For example, in the present embodiment, the amplifier 18a1 and the amplifier 18a2 are sequentially connected in this order to the terminal 26a of the control device 12. Motors 22 are connected respectively to the motor terminal 28a of the amplifier 18a1, the motor terminal 28a of the amplifier 18a2, and the motor terminal 28b of the amplifier 18a2. Needless to say, the connection map may be modified as appropriate.

Figure 2:
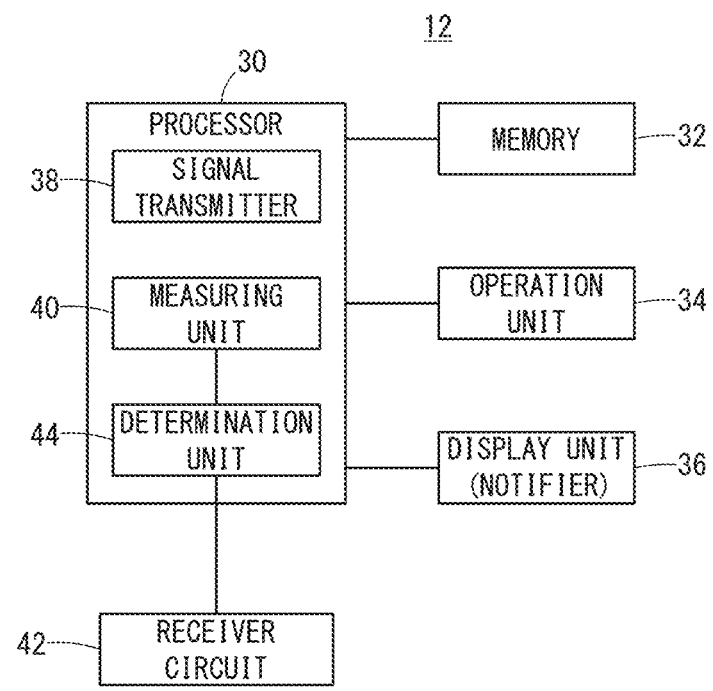
FIG. 2 is a block diagram simply showing a configuration of a control device of the embodiment.

FIG. 2 is a block diagram simply showing a configuration of the control device 12 of the embodiment.

The control device 12 is a device provided in the system 10 to control multiple devices 14, and is, for example, a CNC. The control device 12 of the present embodiment includes a processor 30, a memory 32, an operation unit 34, and a display unit 36 (notifier 36). The processor 30 enables the control device 12 to execute predetermined calculation processing. In addition, the control device 12 can store in the memory 32 programs and variables necessary for the processor 30 to execute predetermined calculation processing, as well as the aforementioned connection map. The operation unit 34 is, for example, an operation panel equipped with keys, or a touch panel. The display unit 36 is, for example, a liquid crystal display (LCD) screen. The control device 12 can accept an operator's request through the operation unit 34 and can display information such as a calculation result on the display unit 36 as appropriate.

The control device 12 includes a signal transmitter 38 that generates and transmits signals as necessary. The signal transmitter 38 is configured as a circuit that generates and transmits a predetermined signal in response to an operator's request or automatic control by a program, or configured as one of the processing units of the processor 30. The signal transmitter 38 of this embodiment is assumed to be one of the processing units in the processor 30. The control device 12 can cause the signal transmitter 38 to generate and transmit a "command signal So" for controlling the sensors connected to amplifiers 18 or IOs 20, for example. Further, the control device 12 can cause the signal transmitter 38 to generate and transmit a signal described as a "call signal Sc" in the present embodiment.

The call signal Sc is a signal that is transmitted from the control device 12 in order to confirm the connection relationship between the control device 12 and a specific device 14. The command signal So and the call signal Sc include at least "destination information" indicating which device 14 (i.e., the first device, the second device, . . . , or the last device from the control device 12) the signal is destined for. Further, when multiple devices 14 are connected to the control device 12 such that multiple groups of devices 14 are connected to respective terminals of the control device (such as branching and daisy chaining) as in this embodiment, the destination information may also include information as to which terminal 26 of the control device 12 the destined device 14 is linked to. Designation of the device 14, indicated by the destination information, is performed by the signal transmitter 38, based on the connection map stored in the memory 32. Here, the control device 12 does not distinguish the types of devices 14 connected to the terminals 26 when transmitting a command signal So or a call signal Sc. For example, when transmitting a call signal Sc from the terminal 26a, the control device 12 does not distinguish, no matter what the device 14 connected to the terminal 26a is, whether it be the amplifier 18a1, the amplifier 18a2, the amplifier 18b1 or the multiple IOs 20.

In addition, the control device 12 includes a measuring unit 40 that measures an elapsed time t from when the signal transmitter 38 transmitted a call signal Sc last, a receiver circuit 42 that receives signals in a wireless manner, and a determination unit 44 that performs determination based on the operation of the measuring unit 40 and the receiver circuit 42. The measuring unit 40 and the determination unit 44 are each assumed to be one of the processing units of the processor 30 in this embodiment. When the signal transmitter 38 transmits a call signal Sc, as will be described later in detail, a signal described as "recall signal Sr" in the present embodiment is transmitted from the communication circuit 16 to the control device 12 in a wireless manner only when a predetermined condition is satisfied. The receiver circuit 42 receives the recall signal Sr wirelessly.

When the receiver circuit 42 receives the recall signal Sr, the determination unit 44 determines that the control device 12 and the device 14 designated as the destination are connected correctly in conformity with the connection map and resets the elapsed time t the measuring unit 40 is measuring. On the other hand, when the elapsed time t measured by the measuring unit 40 exceeds a predetermined time T (t<T) without reception of the recall signal Sr by the receiver circuit 42, the determination unit 44 determines that the control device 12 and the destined device 14 are not connected in conformity with the connection map. The result determined by the determination unit 44 may be appropriately displayed on the display unit 36 (notifier 36).

When, among the multiple devices 14, an amplifier 18 or an IO 20 receives a call signal Sc, it determines whether the destination is the device itself (i.e., the amplifier 18 itself, the IO 20 itself), based on the destination information in the call signal Sc. When the amplifier 18 or the IO 20 determines that the received call signal Sc is destined for the device itself, the amplifier 18 or the IO 20 causes the communication circuit 16 attached thereto to transmit a recall signal Sr. If the amplifier 18 or the IO 20 determines that received call signal Sc is not destined for the device itself, the amplifier 18 or the IO 20 transmits the call signal Sc to another amplifier 18 or IO 20 connected to the subsequent stage without causing the communication circuit 16 to transmit any recall signal Sr.

The amplifier 18 and the IO 20 may determine the destination of the call signal Sc by known signal processing techniques. For example, when the amplifier 18 or the IO 20 transmits the call signal Sc to the subsequent amplifier 18 or IO 20, it may add, to the call signal Sc, information indicating that the call signal Sc has passed through the device itself (i.e., that amplifier 18 itself, that IO 20 itself). In addition, the amplifier 18 or the IO 20 may determine the total number of amplifiers 18 and IOs 20 that the call signal Sc has passed through so far by analyzing the received call signal Sc. Further, the amplifier 18 or the IO 20 may determine which one of the devices 14 (i.e., the first one, the second one, . . . , the last one from the control device 12) the amplifier 18 itself or the IO 20 itself corresponds to, based on the total number of amplifiers 18 and IOs 20 that the received call signal Sc has passed through so far. Then, the amplifier 18 or the IO 20 may determine whether or not the call signal Sc is destined for the device itself (i.e., that amplifier 18 itself, that IO 20 itself), based on the result of the determination as to which one of the devices 14 (i.e., the first one, the second one, . . . from the control device 12) the device itself corresponds to, and the destination information.

When determining the destination of the call signal Sc, the amplifier 18 also determines whether the call signal Sc is destined for one of the motors 22 connected to its own motor terminals 28a and 28b. Further, when the amplifier 18 has determined that the destination of the call signal Sc is one of the motors 22 connected to its own motor terminals 28a and 28b, the amplifier sends the call signal Sc through one of the motor terminals 28*a*, 28*b* determined based on the destination information. The motor 22, when receiving the call signal Sc from the amplifier 18, causes the communication circuit 16 attached thereto to transmit a recall signal Sr. Note that when an IO 20 determines the destination of the call signal Sc, the IO may also determine whether or not the destination of the call signal Sc is a machine connected thereto.

In the system 10 of the present embodiment, the recall signal Sr is transmitted to the control device 12 wirelessly only when the condition that "the device 14 provided with the communication circuit 16 receives a call signal Sc that is destined for the device 14 itself" is satisfied. For the device 14 provided with the communication circuit 16 to receive the call signal Sc destined for the device 14 itself, the control device 12 and the device 14 must be connected as specified in the connection map. Therefore, by checking the result of determination from the determination unit 44 of the control device 12 through the display unit 36 (notifier 36), the operator can easily confirm whether the control device 12 and the device 14 provided with the communication circuit 16 are connected as specified in the connection map.

By repeating the above procedure while attaching the communication unit 24 to the device 14 sequentially from one device to another device, the operator can confirm whether the device 14 is connected correctly according to the connection map or not for all the devices 14 included in the system 10. At this time, regardless of the type of the device 14, the operator simply performs the same procedure of installing the communication circuit 16 in a device 14 and transmitting a call signal Sc that is destined for the device 14 itself, whereby it is possible to confirm the connection relationship between the control device 12 and the device 14.

Figure 3:
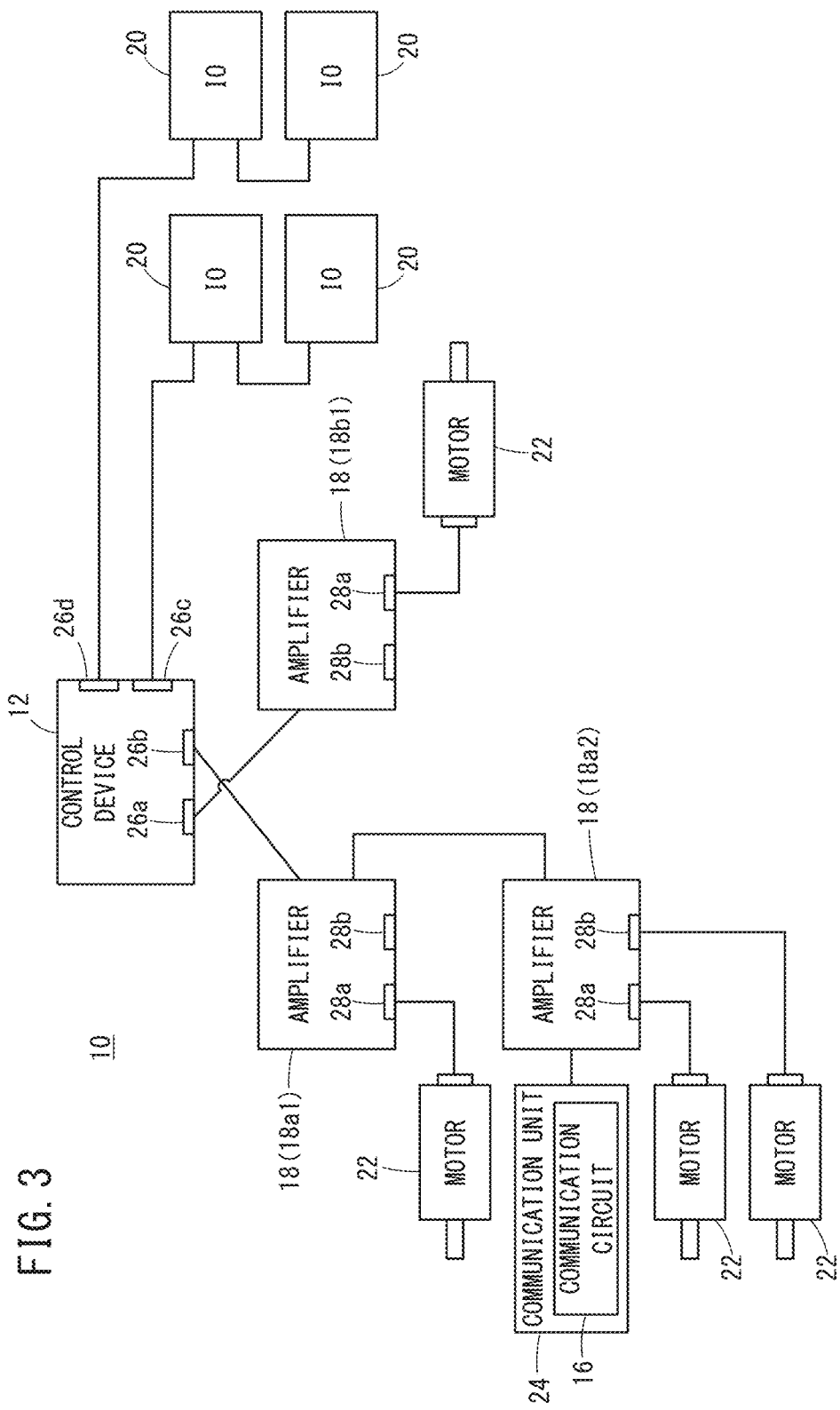
FIG. 3 is a block diagram illustrating an example when there is an erroneous connection in the system of the embodiment.

FIG. 3 is a block diagram illustrating an example when there is an erroneous connection in the system 10 of the embodiment.

Next, the procedure by which the operator confirms the connection relationship between the control device 12 and the device 14 provided with the communication circuit 16 will be described by giving an example. As already described, the control device 12 and multiple devices 14 should be connected based on a predetermined connection relationship (connection map) by the operator's work. In some cases, the control device 12 and multiple devices 14 may be connected differently from the connection map due to human error.

For example, as shown in FIG. 3, the amplifier 18*b*1 may be connected to the terminal 26*a* of the control device 12. The amplifier 18*b*1 is supposed to be connected to the terminal 26*b* of the control device 12 according to the connection map (FIG. 1). In this case, even if a command signal So having the destination information of "the second device 14 from the terminal 26*a* of the control device 12" is transmitted from the terminal 26*a* of the control device 12, the command signal So will not reach the destined amplifier 18. As a result, the system 10 cannot correctly control each of the multiple amplifiers 18 by the control device 12.

In order to check whether there is an erroneous connection in the system 10, the operator attaches the communication unit 24 (communication circuit 16) to a desired device 14 for which the connection relationship with the control device 12 needs to be checked. In this example, the communication unit 24 is attached to the amplifier 18*a*2.

The operator requests the control device 12 to transmit a call signal Sc that is destined for the amplifier 18*a*2 with the communication unit 24 attached thereto. When requested to transmit the call signal Sc, the control device 12 calls the signal transmitter 38. The signal transmitter 38 designates the destination of a call signal Sc based on the operator's request and the connection map, and transmits the call signal Sc. In this example, the operator requests that the amplifier 18*a*2 be the destination. According to the connection map (FIG. 1), the amplifier 18*a*2 is expected to be disposed second from the terminal 26*a* of the control device 12. Therefore, the signal transmitter 38 of the control device 12 transmits a call signal Sc containing the destination information in which "the second device 14 from the terminal 26*a* of the control device 12" is designated as the destination, from the terminal 26*a* of the control device 12. Further, the signal transmitter 38 transmits the call signal Sc, and at the same time the measuring unit 40 starts measuring elapsed time t.

The device 14 that first receives the call signal Sc transmitted from the terminal 26*a* of the control device 12 is the first device 14 from the terminal 26*a*, and in this example is the amplifier 18*b*1. Upon receiving the call signal Sc, the amplifier 18*b*1 determines whether or not the call signal Sc is destined for the amplifier 18*b*1 itself, based on the destination information thereof. Then, the amplifier 18*b*1 determines that the call signal Sc is not destined for the amplifier 18*b*1 itself, and then tries to transmit the call signal Sc to the subsequent device (e.g., another amplifier 18 or IO 20) connected to the downstream of the amplifier 18*b*1. However, as can be seen from FIG. 3, in this example, even if the amplifier 18*b*1 executes a process of transmitting the call signal Sc, there is no device 14 that receives the call signal Sc in the subsequent stage of the amplifier 18*b*1. In such a case, the call signal Sc is discarded. Therefore, in this example, the amplifier 18*a*2 to which the communication unit 24 is attached will not receive the call signal Sc, and the recall signal Sr will not be sent to the control device 12.

In the control device 12, since the receiver circuit 42 does not receive the recall signal Sr even after the call signal Sc is transmitted, the elapsed time t being measured by the measuring unit 40 increases and then exceeds the predetermined time T. Then, as described above, the determination unit 44 determines that the control device 12 and the amplifier 18*a*2 are not connected correctly in conformity with the connection map. The control device 12 displays the result of the determination from the determination unit 44 on the display unit 36 (notifier 36). In this way, the operator can easily confirm that the control device 12 and the amplifier 18*a*2 are not connected as in the connection map.

[Modified Examples]

Though the above embodiment has been described as one example of the present invention, various modifications and improvements can be of course added to the above embodiment. It is also apparent from the scope of claims that the mode added with such modifications and improvements should be incorporated in the technical scope of the invention.

When a motor 22 is specified as the destination of a call signal Sc, the control device 12 may transmit the call signal Sc including a command signal So that instructs the motor 22 to perform a rotation operation. When an amplifier 18 determines that the motor 22 specified as the destination is a motor connected to the amplifier 18 itself and when the call signal Sc includes such a command signal So, the amplifier 18 may control the motor 22 based on the command signal So.

Further, the motor 22 may be provided with a rotation detector 46 that detects the rotational position of the motor 22 and generates a detection signal Sd according to the detection result. In this case, the communication circuit 16 may transmit, as the recall signal Sr, the detection signal Sd indicating the rotational position of the motor 22 detected by the rotation detector 46. At this time, the communication circuit 16 may determine whether or not the detection signal Sd has a predetermined pattern, and if the detection signal Sd does not have the predetermined pattern, it is not transmitted as the recall signal Sr. Causing the communication circuit 16 to transmit only the detection signal Sd having the predetermined pattern, as the recall signal Sr, makes it possible to reduce the risk of the recall signal Sr being erroneously transmitted when there is no need to confirm the connection relationship. Incidentally, determination as to whether or not the detection signal Sd has the predetermined pattern may be made by the rotation detector 46. This makes it possible to easily determine whether or not the control device 12 and the motor 22 are connected in a predetermined connection relationship.

[Invention Obtained from the Embodiment]

The invention that can be grasped from the above embodiment and modified examples will be described below.

The system (10) includes a control device (12) and a plurality of devices (14) connected to the control device (12) in a predetermined connection relationship. The system (10) includes a communication circuit (16) that is provided in at least one of the multiple devices (14) and configured to perform wireless communication. The control device (12) includes: a signal transmitter (38) configured to designate, as a destination, one of the devices (14) that is provided with the communication circuit (16), based on the connection relationship, and transmit a call signal (Sc) to the device (14) designated as the destination; a receiver circuit (42) configured to wirelessly receive a recall signal (Sr), which is transmitted in response to the call signal (Sc); and a determination unit (44) configured to determine that the control device (12) and the device (14) designated as the destination are connected in the connection relationship when the receiver circuit (42) receives the recall signal (Sr), and the communication circuit (16) is configured to wirelessly transmit the recall signal (Sr) to the control device (12) when the device (14) provided with the communication circuit itself has been designated as the destination and when the device (14) provided with the communication circuit itself receives the call signal (Sc).

With the configuration, it is possible to easily detect that the control device (12) and the device (14) are connected in the predetermined connection relationship.

The communication circuit (16) may be provided in a communication unit (24) that is detachably attached to the device (14). Owing thereto, the operator can attach the communication unit (24) to a desired device (14), whereby the communication circuit (16) can be installed in the desired device (14).

The communication circuit (16) may be built in at least one of the multiple devices (14). The built-in communication circuit (16) may be configured to be switchable between valid and invalid states, as desired. This enables the operator to easily confirm the connection relationship between the control device (12) and each device (14).

The system (10) may further include a notifier (36) configured to notify a result of determination made by the determination unit (44). Owing thereto, by monitoring the notifier (36), the operator can easily confirm the result of the determination as to the connection relationship between the control device (12) and the device (14).

The call signal (Sc) transmitted by the control device (12) may include destination information based on the connection relationship. The multiple devices (14) may include at least one of a servo amplifier (18) and an IO (input-output device) (20), multiple servo amplifiers (18) or multiple IOs (20) may be connected to the control device (12) in a daisy chain fashion, and each of the servo amplifiers (18) and the IOs (20) may be configured to determine whether it is the device (14) designated as the destination, based on the destination information, and cause the communication circuit (16) to transmit the recall signal (Sr) when it is the device (14) designated as the destination, and transmit the call signal (Sc) to another device (14) connected at the subsequent stage when it is not the device (14) designated as the destination. With this configuration, the recall signal (Sr) is transmitted to the control device (12) wirelessly only when the condition that the device (14) set with the communication circuit (16) receives a call signal (Sc) destined for that device (14) itself is satisfied.

The multiple devices (14) may include at least a motor (22) connected to the servo amplifier (18). This enables the operator to easily confirm the connection relationship between the control device (12) and a motor (22).

The control device (12) may be configured to transmit the call signal (Sc) including a command signal (So) that instructs a motor (22) to perform a predetermined rotational operation when the control device (12) designates the motor (22) as a destination. The servo amplifier (18) may be configured to determine whether the motor (22) designated as the destination is a motor (22) that is connected to the servo amplifier itself, based on the destination information, and control the motor (22) designated as the destination, based on the command signal (So), when the motor (22) designated as the destination is the motor (22) that is connected to the servo amplifier itself, and transmit the call signal (Sc) to another servo amplifier (18) connected at the subsequent stage when the motor (22) designated as the destination is not the motor (22) that is connected to the servo amplifier itself. The communication circuit (16) may be configured to transmit, as the recall signal (Sr), a detection signal (Sd) indicating the rotational position of the motor (22), detected by a rotation detector (46) provided in the motor (22). Thus, the operator can easily confirm the connection relationship between the control device (12) and the motor (22) by the detection signal (Sd) detected according to the rotation of the motor (22).

What is claimed is:

1. A system including a control device and a plurality of devices connected to the control device in a predetermined connection relationship, the system comprising a communication circuit that is provided in at least one of the plurality of devices and configured to perform wireless communication, wherein the control device comprises:

a signal transmitter configured to designate, as a destination, one of the plurality of devices that is provided with the communication circuit, based on the predetermined connection relationship, and transmit a call signal to the device designated as the destination;

a receiver circuit configured to wirelessly receive a recall signal, which is transmitted in response to the call signal; and a determination circuit configured to determine that the control device and the device designated as the destination are connected in the predetermined connection relationship when the receiver circuit receives the recall signal, and the communication circuit is configured to wirelessly transmit the recall signal to the control device when the device, provided with the communication circuit, itself has been designated as the destination and when the device, provided with the communication circuit, itself receives the call signal, the call signal transmitted by the control device includes destination information based on the predetermined connection relationship, each of the plurality of devices is configured to determine whether it is the device designated as the destination, based on the destination information, and cause the communication circuit to transmit the recall signal when it is the device designated as the destination, and transmit the call signal to another device connected at a subsequent stage when it is not the device designated as the destination, wherein the plurality of devices include at least one of a servo amplifier or an input-output device;

multiple servo amplifiers and multiple input-output devices are connected to the control device in a daisy chain fashion.

2. The system according to claim 1, wherein the communication circuit is provided in a communication unit that is detachably attached to the device.

3. The system according to claim 1, wherein the communication circuit is built in at least one of the plurality of devices.

4. The system according to claim 1, further comprising a notifier configured to notify a result of determination made by the determination circuit.

5. The system according to claim 1, wherein the plurality of devices include at least a motor connected to the servo amplifier.

6. The system according to claim 5, wherein:

the control device transmits the call signal including a command signal that instructs a motor to perform a predetermined rotational operation when the control device designates the motor as the destination;

the servo amplifier is configured to determine whether the motor designated as the destination is a motor that is connected to the servo amplifier itself, based on the destination information, and control the motor designated as the destination, based on the command signal, when the motor designated as the destination is the motor that is connected to the servo amplifier itself, and transmits the call signal to another servo amplifier connected at the subsequent stage when the motor designated as the destination is not the motor that is connected to the servo amplifier itself; and the communication circuit is configured to transmit, as the recall signal, a detection signal indicating a rotational position of the motor, detected by a rotation detector provided in the motor.

* * * * *